United States Patent [19]

Idogaki et al.

[11] 4,345,228

[45] Aug. 17, 1982

[54] ROTARY ACTUATOR

[75] Inventors: Takaharu Idogaki, Okazaki; Hisasi Kawai; Takeshi Matsui, both of Toyohashi; Kyo Hattori, Susono; Kazuhiro Sakurai, Gotenba, all of Japan

[73] Assignees: Nippon Soken, Inc., Nishio; Toyota Jidosha Kogyo Kabushiki Kaisha, Toyota, both of Japan

[21] Appl. No.: 256,832

[22] Filed: Apr. 23, 1981

[30] Foreign Application Priority Data

Apr. 24, 1980 [JP] Japan .................................. 55/54979

[51] Int. Cl.$^3$ ............................................. H01F 7/14
[52] U.S. Cl. .................................... 335/222; 335/229; 335/272; 335/274; 310/36
[58] Field of Search ................. 335/229, 230, 219, 76, 335/150, 222, 238, 266, 269, 272, 274, 181, 182; 251/65, 129; 137/82, 625, 64; 210/29, 36; 318/100, 159, 40

[56] References Cited

U.S. PATENT DOCUMENTS 3,304,524  2/1967  Zoltan ............................ 335/230 X
4,282,502  8/1981  Nicholson ....................... 335/229 X

*Primary Examiner*—L. T. Hix
*Assistant Examiner*—S. D. Schreyer
*Attorney, Agent, or Firm*—Cushman, Darby & Cushman

[57] ABSTRACT

A rotary actuator for imparting a rotational force to a rotary valve member of a multi-way valve device has a cylindrical housing and an electric motor housed therein and being operative to produce a torque corresponding to the input current supplied to the motor. The motor shaft is hollow and rotatably journalled by the end walls of the motor housing. A torsion bar is housed in the shaft and fixed at one end to one end of the shaft. The other end of the torsion bar is fixed to the housing so that, when rotational force is imparted by the motor to the shaft and thus the rotary valve member connected thereto, the torsion bar produces a return force applied to the shaft. The angular position of the other end of the torsion bar about the axis thereof is adjustable within a limited range. The actuator is suited to impart a rotational motion of less than 180° and provides a reduced hysteresis in the rotation characteristics.

7 Claims, 9 Drawing Figures

ROTARY ACTUATOR

BACKGROUND OF THE INVENTION

1. Field of the Invention

The present invention relates to a rotary actuator for rotatably actuating a controlling device, such as a multi-way valve, to an angle corresponding to the magnitude of the input to the actuator.

2. Description of the Prior Art

A known rotary actuator for providing an angle of rotation of less than about 180° has a bipolar motor having a return coil spring connected to the shaft of the motor so that the motor shaft is rotated to a position where a balance is attained between the driving torque produced electro-magnetically in accordance with the input current and the recovery force exerted to the motor shaft by the return spring.

The known rotary actuator, however, involves a problem that, as shown in FIG. 1, the angle of rotation attained with a given magnitude of input current during an increase of the input current is different from that attained with the same magnitude of input current in the course of decrease of the input current. This difference is attributable to various factors such as the friction between the motor shaft and bearings, friction between turns of the coil spring and so forth. Among these various factors, the mutual contact between the adjacent turns of the coil spring and the contact between the coil spring and other component parts are most influential. The influence of these factors is more serious in the case where the rotary actuator is mounted on a vehicle such as an automobile.

SUMMARY OF THE INVENTION

It is a principal object of the present invention to provide an improved rotary actuator which eliminates the prior art problem discussed above.

According to the present invention, there is provided a rotary actuator for imparting a rotational force to a driven element, comprising a substantially cylindrical hollow housing, a hollow shaft rotatably mounted on said housing, a driving means for imparting a rotational driving torque to said shaft, said shaft being adapted to be operatively connected at one end to said driven element, and a torsion bar disposed in said shaft substantially coaxially therewith and having ends secured to said shaft and said housing, respectively, to thereby act against said rotational driving torque of said driving means.

The driving means may preferably be an electric motor operative to produce a torque corresponding to the input current supplied to the motor.

The rotary actuator according to the present invention may advantageously, but not restrictively be used to actuate a multi-way valve used in an automotive internal combustion engine, for example.

The above and other objects, features and advantages of the present invention will be made more apparent by the following description with reference to the accompanying drawings.

DESCRIPTION OF THE PREFERRED EMBODIMENTS

Figure 1:
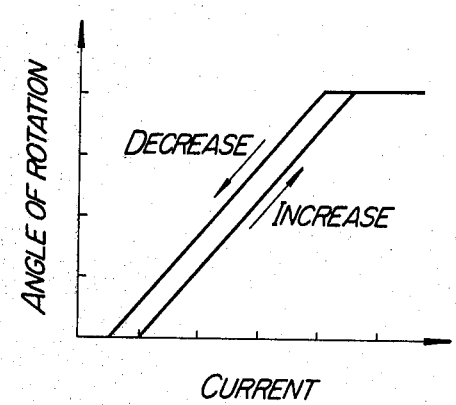
FIG. 1 is a graph showing the operation characteristic of the conventional rotary actuator.
Figure 2:
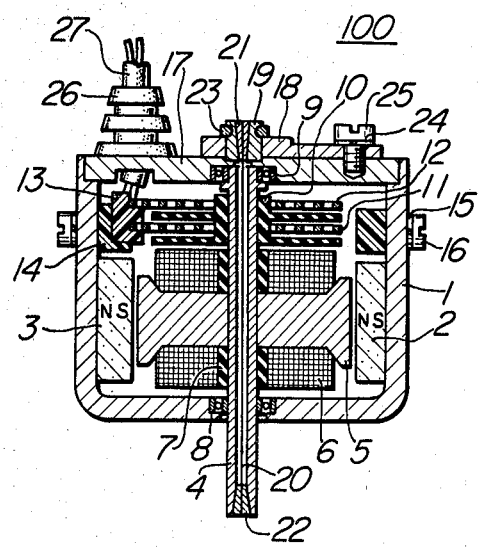
FIG. 2 is an axial sectional view of a rotary actuator constructed in accordance with a first embodiment of the invention.
Figure 3:
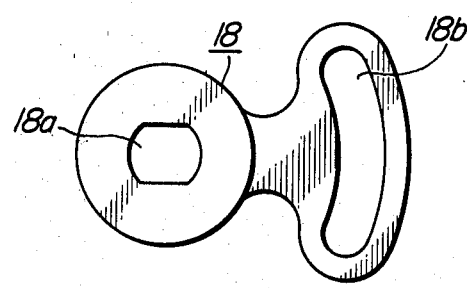
FIG. 3 is an enlarged plan view of an adjuster incorporated in the rotary actuator shown in FIG. 2.
Figure 4A:
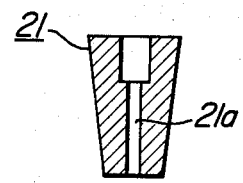
FIG. 4A is an enlarged axial sectional view of a holder incorporated in the rotary actuator shown in FIG. 2.

Referring first to FIGS. 2 to 4 showing a first embodiment of the invention, a rotary actuator 100 of the first embodiment has a housing 1 made of a magnetic material and accommodating a pair of arcuate permanent magnets 2, 3 so disposed as to oppose each other and bonded by an adhesive to the inner peripheral surface of the housing 1. The permanent magnet 2 is magnetized to have N and S poles at its radially inner side and outer side, respectively, while the permanent magnet 3 is magnetized to exhibit S and N polarities at their radially inner side and outer side, respectively. The rotary actuator further has a hollow shaft 4 rotatably supported by bearings 8 and 9, bearing 8 being fitted in the bottom wall of the housing 1 while bearing 9 is mounted in an end plate 17 closing the opened upper end of the housing 1. A reference numeral 5 denotes an armature mounted on the shaft 4. The armature 5 carries a coil 6 thereon. The coil 6 is electrically insulated from the shaft 4 by first insulator 7 fitted around the shaft 4. A second insulator 10 which is also fitted around the shaft 4 electrically insulates the latter from a pair of electric power feeder springs 11, 12. The feeder springs 11, 12 are connected to a support 13 made of bakelite and are soldered to a lead line 27. The lead line 27 includes two conductors one of which is connected to the feeder spring 11 while the other is connected to the feeder spring 12. The feeder springs 11, 12 are connected at their other ends to the coil 6. The support 13 is fixed to a ring holder 14 made of bakelite which in turn is fixed to the housing 1 by means of screws 16 and spring washers 15. The aforementioned end plate 17 is caulked to the housing 1.

Figure 4B:
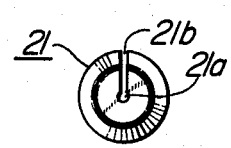
FIG. 4B is a bottom plan view of the holder shown in FIG. 4A.

An adjuster 18 has a hole 18a (FIG. 3) for receiving a spring holder 19 having a tapered hole, and an elongated arcuate slot 18b (FIG. 3) for receiving a screw 25. The adjuster 18 is adjustably fixed to the end plate 17 by means of the screw 25 which cooperates with a spring washer 24. A tapered first holder 21 is adapted to be inserted into the spring holder 19 and is provided with a small hole 21a (FIG. 4A) and a slit 21b (FIG. 4B). A reference numeral 20 designates a torsion bar made of stainless steel wire and received in the internal cavity of the shaft 4. The torsion bar 20 is received at its one end by the hole 21a of the first holder 21 which in turn is driven into the spring holder 19 to fix the above-mentioned one end of the torsion bar 20. The other end of the torsion bar 20 is inserted into a second holder 22 of the same construction as the first holder. This second holder 22 is driven into the shaft 4 thereby to fix the above-mentioned other end of the torsion bar 20. A reference numeral 23 denotes a circlip for fixing the spring holder 19, while a reference numeral 26 designates a grommet of rubber.

The feeder springs 11, 12 are made of phosphor bronze, in the forms of coiled springs and can provide very weak recovery force. In addition, these springs are arranged to avoid any mutual contact between adjacent turns of each spring and any contact with any other parts around the springs.

The rotary actuator of the first embodiment having the construction described above operates in the manner described hereinunder.

The driving section of the actuator operates as a bipolar motor. A magnetic path is formed to extend from the N pole of the permanet magnet 2 through the armature 5, the S pole of the permanent magnet 3, the N pole of the permanet magnet 3, the housing 1 and to the S pole of the permanent magnet 2.

Figure 5:
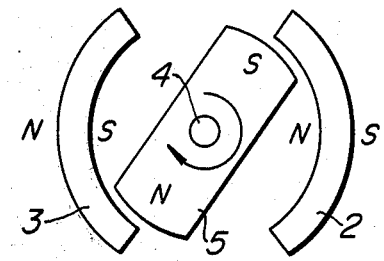
FIG. 5 is a schematic illustration for explaining the operation of the rotary actuator of the invention.

Referring to FIG. 5 showing the principle of operation, it is assumed that the coil 6 is electrically energized, the armature 5 is magnetized to have N and S poles, as illustrated. The permanent magnet 2 attracts the S pole of the armature 5 while the permanent magnet 3 acts to repel the same. On the other hand, the N pole of the armature 5 is attracted by the permanent magnet 3 and repelled by the permanent magnet 2. In consequence, a torque is applied to the armature 5 and shaft 4 to rotate the latter in the direction of an arrow shown in FIG. 5. Since the magnetic flux formed by the permanent magnets 2 and 3 is constant in magnitude, the torque applied to the armature 5 and the shaft 4 is in proportion to the magnetic force produced by the armature 5, i.e., to the magnitude of the electric current passing through the coil 6. As a result of the unitary rotation of the armature 5 and the shaft 4 in the direction shown by the arrow in FIG. 5, the torsion bar 20 is twisted with a resultant increase in the recovery force. In other words, a force which tends to rotate the shaft 4 and the armature 5 in the direction opposite to the direction of the arrow in FIG. 5 is produced in the torsion bar 20. The magnitude of this recovery force is increased in direct proportion to the increase in the angle of rotation of the shaft 4 and the armature 5. Therefore, a balance is attained between the torque of the magnetic force generated by the electric current passing through the coil 6 and the recovery force generated in the torsion bar 20, so that the shaft 4 is stopped at this rotational position. In the described and illustrated embodiment, the maximum angle of rotation is 72°.

The recovery force of the torsion bar 20 can be adjusted by changing the rotational position of the adjuster 18.

Figure 6:
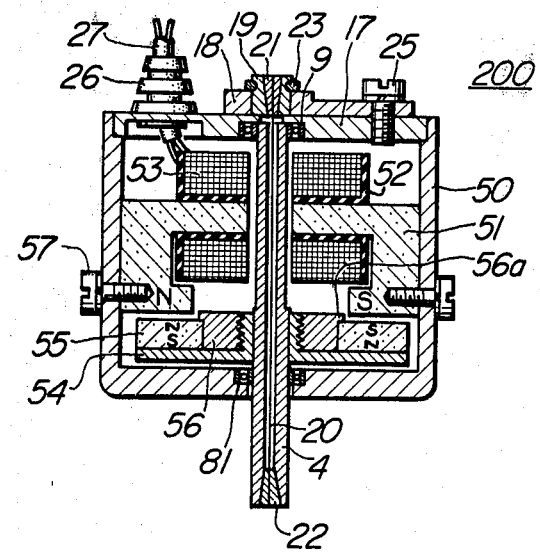
FIG. 6 is an axial sectional view of a rotary actuator constructed in accordance with a second embodiment of the invention.

Hereinafter, a description will be made as to a second embodiment of the invention with specific reference to FIG. 6. The rotary actuator of this second embodiment is generally designated by 200 and has a housing 50 made of aluminum and a core 51 made of a magnetic material and fixed to the housing at two points by means of screws 57. A spool 52 is placed in the core 51, while a coil 53 is wound on the spool 52. A plate 54 made of a magnetic material is fitted onto a shaft 4. A magnet 55 is made of an anisortropic ferrite magnet and is magnetized at two portions thereof spaced in the axial direction. An internally-threaded holder 56 is screwed to the plate 54 so that the flange portion 56a of the holder 56 fixes the magnet 55 to the plate 54. A lead line 27 includes two conductors one of which is connected to the starting end of the coil winding of the coil 53 while the other conductor is connected to the terminal end of the coil. In FIG. 6, the parts or members designated by the same reference numerals as those in FIGS. 2 to 4 are the parts or members identical or equivalent to those of the first embodiment shown in FIGS. 2 to 4. The detailed description of these parts or members, therefore, is omitted.

The rotary actuator of the second embodiment having the construction described above operates in a manner explained hereinunder.

Referring again to FIG. 6, the left portion of the magnet 55 is magnetized to have an N pole and an S pole at its upper and lower sides, while the right portion of the magnet 55 is magnetized to have an upper S pole and a lower N pole, as illustrated. Therefore, a magnetic path is formed to extend from the left S pole of the magnet 55 through the plate 54, the right N pole of the magnet 55, the right S pole of the magnet 55, the core 51 and to the left N pole of the magnet 55. When the coil 53 is energized in this state, the core 51 is magnetized to have an N pole and an S pole at its left and right sides in FIG. 6, respectively. In consequence, a repelling force is produced to generate a torque which tends to rotate the magnet 55. This torque is in direct proportion to the electric current flowing through the coil 53. The shaft 4, which is fixed to the magnet 55, is stopped at a rotational position where this torque is balanced by the recovery force of the torsion bar 20. The angle of rotation of the shaft 4 is direct proportion to the magnitude of the electric current so long as the angle of rotation is not greater than 90° because the spring constant of the torsion bar 20 is maintained constant.

As described above, the torsion bar 20 is used as a return spring and is accommodated in the shaft 4 to avoid interference between the torsion bar 20 and other component parts. This arrangement assures that the hysteresis of the rotation characteristic in relation to the input current is maintained and that the assembling of the actuator is facilitated and the size of the actuator as a whole is reduced.

Although a DC motor is used as the driving section in each of the described embodiments, this is not exclusive and any type of motor such as AC bipolar motor, induction motor or the like can be used as the driving section insofar as it can impart to the shaft 4 a torque corresponding to the input signal.

Figure 7:
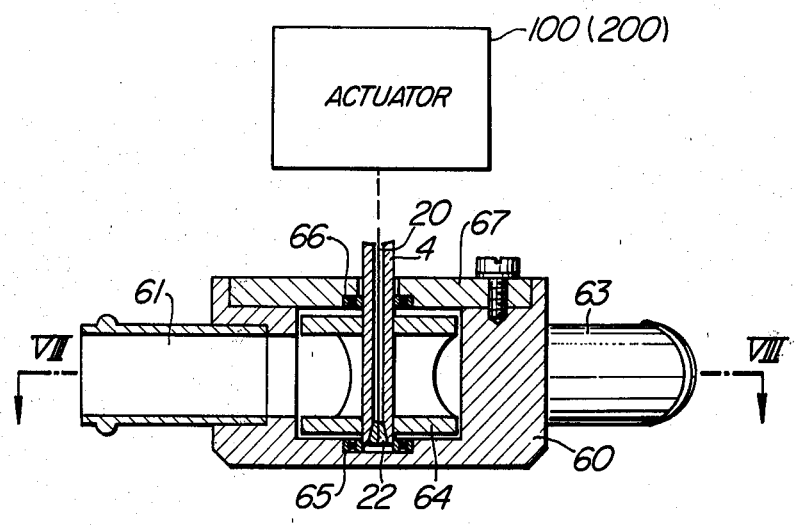
FIG. 7 is a partly diagrammatic and partly sectional view illustrating an example of the use of the rotary actuator.
Figure 8:
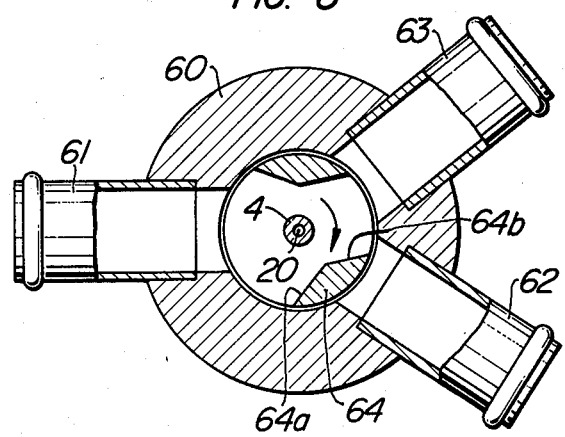
FIG. 8 is a sectional view taken along the line VIII—VIII in FIG. 7.

FIGS. 7 and 8 show an example of control means actuated by the rotary actuator 100 or 200 of the first or the second embodiment of the invention.

The control means have a valve housing 60 provided with three openings to which are connected pipes 61 to 63. For instance, the first pipe 61 is connected to an air pump (not shown), while the second pipe 62 is connected to an exhaust system of an engine which is also not shown. The third pipe 63 is connected to an air cleaner which is also not shown in the drawings.

A rotor 64 is rotatably received in a central cylindrical bore of the valve housing 60. This rotor 64 is fixed to the end of the shaft 4 of the rotary actuator 100 (200) of the invention. The rotor 64 is provided with an inlet port 64a of a size greater than that of the internal passage of the pipe 61, and with an outlet port 64b of a size substantially equal to the size of the internal passages in the second and third pipes 62, 63. Reference numerals 65 and 66 denote bearings for supporting the shaft 4. A closure of the valve housing 60 is designated at a reference numeral 67.

The arrangement is such that the outlet port 64b communicates solely with the third pipe 63 when the actuator 100 (200) is not energized. According to this arrangement, the shaft 4 is rotated with the rotor 64 in the direction of an arrow shown in FIG. 8, over an angle of rotation corresponding to the magnitude of the electric current supplied to the actuator 100 (200), to thereby provide a secondary air flow rate characteristics proportional to the input electric current.

Although a three-way valve utilizing the rotor 64 is shown as the control means actuated by the rotary actuator according to the invention, it is possible to use a butterfly valve or a two-way valve in place of the three-way valve. The control means for controlling the secondary air supplied to the engine has been described to show an example of the uses of the rotary actuator of the invention. However, it will be understood that the rotary actuator of the present invention can be applied to other various uses.

As described above, the present invention provides a rotary actuator which has a diminished hysteresis in the rotation characteristics and which is reduced in size and can be easily assembled with other elements or component parts to be associated with the actuator.

What is claimed is:

1. A rotary actuator for imparting a rotational force to a driven element, comprising:
   a substantially cylindrical hollow housing,
   a hollow shaft rotatably mounted on said housing,
   a driving means for imparting a rotational driving torque to said shaft, said shaft being adapted to be operatively connected to said driven element,
   a torsion bar disposed in said shaft substantially coaxially therewith and having a first end secured to said shaft and a second end secured to said housing to thereby act against said rotational driving torque of said driving means,
   first means for securing said first end of said torsion bar to said shaft, and
   second means for securing said second end of said torsion bar to said housing, each of said first and second means including a tapered member formed with an axial central hole for securely receiving said torsion bar therein and a slit radially extending between said central hole and the tapered outer peripheral surface of said tapered member.

2. A rotary actuator according to claim 1, wherein said driving means comprises an electric motor operative to produce a torque corresponding to an input current supplied to said motor.

3. A rotary actuator according to claim 1, wherein said housing has first and second end walls with openings formed therein substantially centrally thereof for rotatably supporting said shaft, said second end wall being secured to said second end of said torsion bar.

4. A rotary actuator according to claim 3, further comprising an adjuster coupled with said tapered member of said second securing means for adjusting the rotational position of said torsion bar relative to said housing.

5. A rotary actuator according to claim 4, wherein said adjuster comprises a radial member disposed on said second end wall of said housing and extending substantially radially thereof, said radial member being provided with an axially tapered hole formed therein adjacent the radially inner end thereof for securely receiving said tapered member of said second means, said radial member being rotatable substantially about the axis of said torsion bar to adjust the angular position of said torsion bar relative to said housing, and wherein the inner surface of said hollow shaft is axially tapered at one end thereof close to said first end wall of said housing for securely receiving said tapered member of said first means.

6. A rotary actuator according to claim 5, wherein an arcuate slot is formed in said radial member adjacent the radial outer end thereof and a screw member extends through said arcuate slot and is releasably screwed into a threaded hole formed in said second end wall of said housing.

7. A rotary actuator according to claim 6, wherein said first end of said shaft is operatively connected to a rotary valve member of a multi-way valve.

* * * * *